(12) United States Patent
Lachenmayr et al.

(10) Patent No.: US 12,335,063 B2
(45) Date of Patent: Jun. 17, 2025

(54) PROVIDING A SERVICE IN A NODE OF A CYBER-PHYSICAL SYSTEM HAVING AT LEAST TWO APPLICATION MODULES

(71) Applicant: Siemens Aktiengesellschaft, Munich (DE)

(72) Inventors: Markus Lachenmayr, Bavaria (DE); Joachim Fröhlich, Kirchseeon (DE); Tudor Ionescu, Vienna (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/022,559

(22) PCT Filed: Jul. 12, 2021

(86) PCT No.: PCT/EP2021/069283
§ 371 (c)(1),
(2) Date: Feb. 22, 2023

(87) PCT Pub. No.: WO2022/042926
PCT Pub. Date: Mar. 3, 2022

(65) Prior Publication Data
US 2023/0318870 A1    Oct. 5, 2023

(30) Foreign Application Priority Data
Aug. 28, 2020   (EP) .................................. 20193491

(51) Int. Cl.
*H04L 67/12* (2022.01)
*H04L 12/28* (2006.01)

(52) U.S. Cl.
CPC ............ *H04L 12/283* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 8,793,359 B1 * | 7/2014 | Fiebig ................. | G06F 11/3003 719/313 |
| 10,951,738 B1 * | 3/2021 | Selegean ................. | G06F 9/547 |

(Continued)

OTHER PUBLICATIONS

PCT International Search Report and Written Opinion of International Searching Authority mailed Oct. 29, 2021 corresponding to PCT International Application No. PCT/EP2021/069283 filed Dec. 7, 2021.

*Primary Examiner* — Joshua Joo
(74) *Attorney, Agent, or Firm* — Schmeiser, Olsen & Watts LLP

(57) ABSTRACT

A computer-implemented method for providing at least one service in a node or process of a cyber-physical system has at least two application modules, wherein a communication between the at least two application modules occurs via respective application interfaces of the at least two application modules, which application interfaces are offered specifically to the particular application module, wherein a particular application interface which is offered specifically to the particular application module represents a communication access to the particular application module. According to the invention, at least the application interfaces of the at least two application modules which are offered specifically to the application module are implemented by a coupling module which establishes the communication between the at least two application modules and which provides the at least one service in an activatable manner.

15 Claims, 11 Drawing Sheets

(56) References Cited

U.S. PATENT DOCUMENTS

| | | | |
|---|---|---|---|
| 2005/0010893 A1* | 1/2005 | Schmidt | G06F 8/70 |
| | | | 717/103 |
| 2006/0095551 A1* | 5/2006 | Leung | H04L 41/22 |
| | | | 709/223 |
| 2006/0159077 A1 | 7/2006 | Vanecek | |
| 2008/0140857 A1 | 6/2008 | Conner et al. | |
| 2017/0006135 A1 | 1/2017 | Siebel et al. | |
| 2017/0187818 A1 | 6/2017 | Haswell et al. | |
| 2021/0263945 A1* | 8/2021 | Siebel | G06F 8/24 |

* cited by examiner

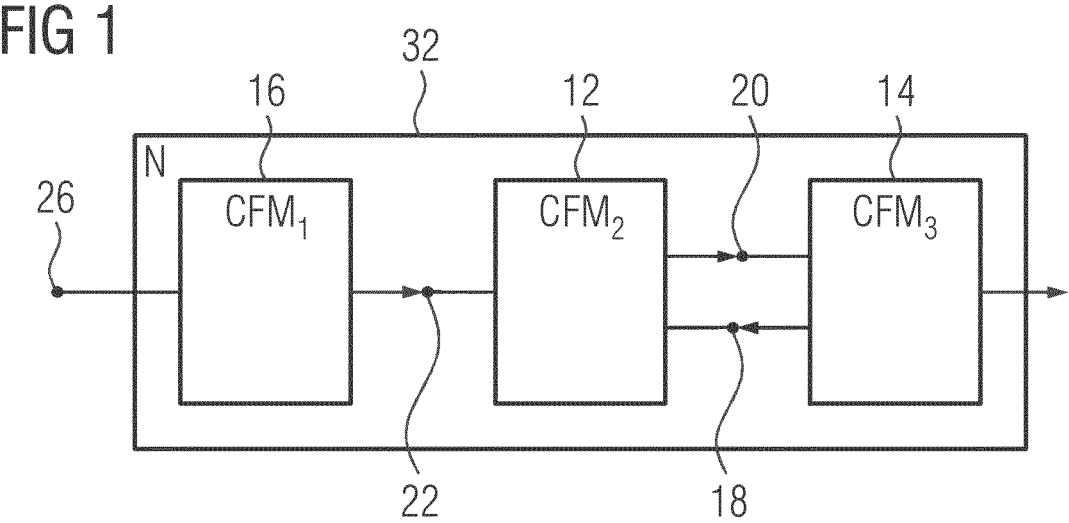
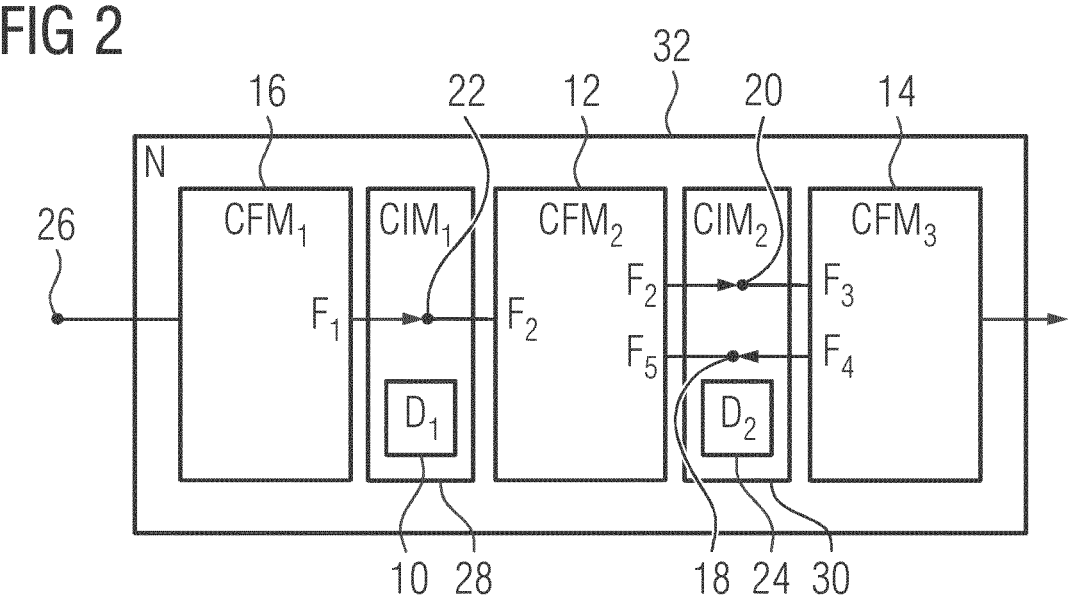

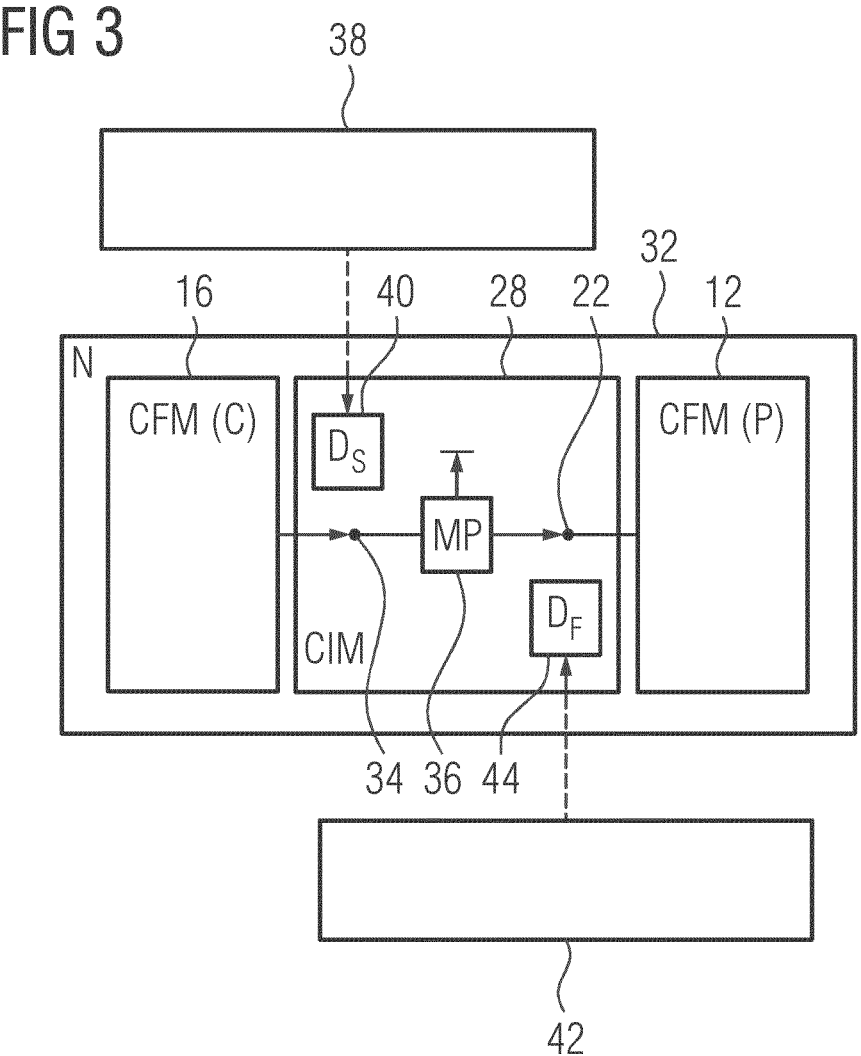

PROVIDING A SERVICE IN A NODE OF A CYBER-PHYSICAL SYSTEM HAVING AT LEAST TWO APPLICATION MODULES

CROSS-REFERENCE TO RELATED APPLICATIONS

This application claims priority to PCT Application No. PCT/EP2021/069283, having a filing date of Jul. 12, 2021, which claims priority to EP Application No. 20193491.6, having a filing date of Aug. 28, 2020, the entire contents both of which are hereby incorporated by reference.

FIELD OF TECHNOLOGY

The following relates to a computer-implemented method for providing at least one service in a node or process of a cyberphysical system having at least two application modules, wherein communication takes place between the at least two application modules via respective application interfaces, offered in an application module-specific manner, of the at least two application modules, wherein a respective one of the application interfaces offered in an application module-specific manner constitutes communication access to the respective application module. The following furthermore relates to a computer program product comprising a program for a computer unit. The following furthermore comprises an electronically readable data carrier with electronically readable control information stored thereon. The following furthermore relates to a cyberphysical system having a node or process that has at least two application modules, wherein a respective one of the at least two application modules has a respective application interface, offered in an application module-specific manner, via which communication takes place between the at least two application modules, wherein a respective one of the application interfaces offered in an application module-specific manner constitutes communication access to the respective application module. The following also relates finally to a coupling module.

BACKGROUND

Generic computer-implemented methods, computer program products and electronically readable data carriers are all widely known in the prior art, as are cyberphysical systems and coupling modules. The generic methods, computer program products and electronically readable data carriers serve in particular for use in a cyberphysical system. A cyberphysical system (CPS) denotes a combination of IT or software components with mechanical and/or electronic devices that are connected to one another in terms of communication via a data infrastructure, for example a communication network such as a local or a global communication network, in particular the Internet. This may in particular involve an operating system process within which communication takes place, for example by virtue of application modules communicating with one another.

A cyberphysical system is distinguished inter alia by a high degree of complexity. Cyberphysical systems generally have one or more embedded systems that are connected to one another in terms of communication by way of the communication networks. A cyberphysical system may for example be a smart power grid, a new-generation industrial installation that is able to adapt dynamically to respective production requirements, a robot and/or the like. Cyberphysical systems may also be for example medical devices or systems, age-related assistance systems, traffic control systems, traffic logistics systems, networked safety systems, networked driving assistance systems for vehicles, industrial process control systems, automation systems, environment-influencing and observation systems, energy supply management systems, military networking systems, infrastructure systems for communications and culture and/or the like. They are also used in autonomic computing, which may comprise options for self-configuration, self-optimization and self-healing. Autonomic computing enables fault recognition and fault tolerance in computer-based systems. Autonomic computing relates inter alia to self-organization or a usage level.

In cyberphysical systems, there is a demand for the ability to control and observe the cyberphysical system, for example attributes of cyberphysical systems that act autonomously, are able to be operated in changing environments and therefore have system and product properties that are quick to develop or quick to change and/or are able to be operated with low system resources within tight limits.

This demand has various facets:
  A lack of control regarding performance attributes of computer programs of cyberphysical systems that are distributed for example among field devices and run thereon.
  System service levels for functions of the computer programs of the cyberphysical system are difficult to determine and therefore difficult to guarantee.
  System service levels for functions of the computer programs of the cyberphysical system that change in different modes and have different life cycle phases.
  It is difficult to determine how functions of cyberphysical systems are used by system clients, for example with regard to usage profiles, frequency, data input and output and/or the like.
  Complex monitoring and testing of field devices.
  Programming languages, programming tools and provider-specific solutions are complex, difficult to adapt or to configure consistently and also difficult to audit in application-specific environments.
  When the computer program of a cyberphysical system node or part is adaptable, then this is usually before a system runtime.

These problems are exacerbated by complex systems with short system, product and feature lifecycles and complicated system structures. Methods that combine program development and provision (DevOps) and thus increase speed, leading to new, updated and/or changed program features for a target system, make the situation even more difficult.

Up until now, the abovementioned problems were able to be dealt with only in the course of rebuild, test, redeploy of an entire system programming. These are however complex, expensive and time-consuming processes. Up until now, it has also been conventional to provide aspect-oriented programming (AOP). Crosscutting or cross-functional services (CFS), which concern some portions of the program system, such as for example logging of performance properties and also performance auditing, may thus be organized in specific code blocks. Specific software portions are provided with the required CFS. Specific compilers translate the CFS into computer programs based on source code or based on machine code.

Furthermore, performance services and runtime environments are able to be configured by CPS only before runtime. The configuration or adaptation of performance services, parameters of CPS applications and making them consistent with operating system services or parameters is an application development task. The following relates to the abovementioned problem, in particular with regard to cyberphysical systems.

SUMMARY

An aspect relates to developing a generic method, in particular for a cyberphysical system, a computer program product (non-transitory computer readable storage medium having instructions, which when executed by a processor, perform actions), an electronically readable data carrier, a cyberphysical system and a coupling module such that the abovementioned problems are able to be reduced.

With regard to a generic method, embodiments of the invention propose in particular to implement at least the application interfaces, offered in an application module-specific manner, of the at least two application modules by way of a coupling module that establishes the communication between the at least two application modules and that provides the at least one service in an activatable manner.

With regard to a generic computer program product, it is in particular proposed for the program to contain program code sections of a program for carrying out the steps of a method according to embodiments of the invention when the program is executed by the computer unit, such that at least one service is provided in an activatable manner in communication between at least two application modules of a cyberphysical system.

With regard to a generic electronically readable data carrier with electronically readable control information stored thereon, it is in particular proposed for the control information to comprise at least one computer program product according to embodiments of the invention and to be designed such that, when a computer unit is controlled using the control information of the data carrier, the computer unit performs the method of embodiments of the invention.

With regard to a generic cyberphysical system, embodiments of the invention in particular propose for the cyberphysical system to have a coupling module in which at least the application interfaces, offered in an application module-specific manner, of the at least two application modules are implemented and which is designed to establish the communication between the at least two application modules and to provide at least one service in an activatable manner.

With regard to a generic coupling module, it is in particular proposed for the application module to be designed to provide at least one service in an activatable manner in communication between at least two application modules, wherein the coupling module is designed for the cyberphysical system according to embodiments of the invention.

Embodiments of the invention are based inter alia on the concept that the coupling module, hereinafter also referred to as CPS interface module (CIM), is able to extract interfaces from CPS function modules (CFM) or application interfaces, for example of the at least one application module, that is to say extract interfaces of these modules from the CPS function modules and combine them in the separate coupling module, such that the communication is able to take place between the at least two application modules via the coupling module. This provides the option of using the coupling module or the CIM to provide an additional new service in an activatable manner.

The application module may for example be a control module of a robot arm or the like. The control module may for example have a computer unit that serves to control the robot arm. The application modules each provide an interface, specifically the application interface, which constitutes an application interface offered in an application module-specific manner. The application module uses this interface to provide communication access via which for example data are able to be exchanged. The application interface may also be designed for example as a programming interface (application programming interface; API) via which a program portion of a system program may be made available to other computer programs for connection to the program system. Of course, embodiments of the invention are not restricted to this. The application modules could in principle also both be respective computer units or the like.

It is possible to conduct the communication between the application modules via the interfaces. For this purpose, the first application module may transmit its data to the respective second application module via the application interface of the second application module. Conversely, the second application module may transmit its data to the first application module via the application interface of the first application module. This makes it possible to achieve bidirectional communication between the application modules. Depending on requirements, under some circumstances, unidirectional communication between the application modules may also be sufficient, for example when one of the application modules is formed by a sensor or the like that delivers sensor data to the application module, one of the application modules delivers movement data to the other of the application modules in order to carry out a predefinable movement and/or the like. Embodiments of the invention also of course do not need to be limited to a combination of two application modules. On the contrary, there is the option of additionally taking into consideration additional application modules or control modules. However, this is not relevant to the basic principle of embodiments of the invention.

The coupling module or CIM then makes it possible, due to the fact that the interfaces are implemented in the coupling module, to easily make additional services available.

A function specifies what the cyberphysical system (CPS) is supposed to carry out. It thus constitutes an operation or a mode in a function domain of the cyberphysical system. Such a cyberphysical system may be for example a robot arm having a gripper, in particular in a domain of constructing goods in the broadest sense with task-related functions, such as for example moving the robot arm, opening the gripper, gripping a workpiece, screwing clockwise and/or the like. Functions are contained or implemented in CPS function modules (CFN).

A service on the other hand may be determining what the cyberphysical system is supposed to do. Furthermore, an operation in a monitoring domain of a cyberphysical system is therefore also called extra-functional service, for example a service for monitoring, testing and safeguarding functions of the cyberphysical system. Services are contained or implemented in CPS service modules (CSM).

It is thus possible to implement a simple mechanism between two or more intercommunicating modules of a cyberphysical system node or process in order to dynamically load modular, extra-functional services into individual cyberphysical system nodes or processes, to control them, for example to activate them and to deactivate them, and to dynamically remove them, specifically in particular during runtime of the cyberphysical system. To this end, the mechanism installs mount points in at least one coupling module at which the extra-functional services in separate targeted service modules, which may be dynamic during runtime of a cyberphysical system node or process, are able to intervene, are able to be controlled and are also able to be decoupled again.

Extra-functional services may comprise monitoring and testing individual functions and data, cost planning for resources, for example execution times of functions, number of activations of functions, a scope of the functions, the checking of function access rights, selecting and changing over between alternative but different functional implementations, for example in fallback situations or handover situations, and testing conditions between intercommunicating function modules. The functional modules may for example be application modules.

Integrating mount points into a cyberphysical system node or process by way of the proposed mechanism of embodiments of the invention does not change the structure or implementation of the cyberphysical functions in the intercommunicating function modules.

The function modules are provided at least partially by one or more computer units that are run with a suitable computer program. However, there is in principle also the option of implementing one or more of the function modules at least partially also by way of a correspondingly suitable hardware circuit. It proves to be particularly advantageous for the function modules to be implemented or provided at least partially in cloud-based form. This provides the option of providing and possibly also maintaining the function modules practically independently of a location for the desired function.

The cyberphysical system, in particular the application module, may have an electronic circuit, a computer unit, combinations thereof and/or the like. The computer unit may be configured such that it is able to at least partially carry out the method according to embodiments of the invention, for which purpose it is controlled accordingly by way of the computer program. Both the computer unit and the electronic circuit may be formed by one or more semiconductor chips. The cyberphysical system, in particular the application module, may furthermore also have discrete electronic components and combinations containing semiconductor chips. The cyberphysical system, in particular the application module, may in particular comprise a storage unit in which training datasets may be at least partially stored. The computer program for the computer unit may furthermore be at least partially stored in the storage unit. The cyberphysical system may also be designed at least partially in cloud-based form. The computer unit may in particular be designed as a distributed computer unit, be designed at least partially so as to form a cloud.

The abovementioned computer program product may be provided by way of a computer-readable storage medium. The computer program may furthermore be able to be loaded directly into an internal memory of the computer unit. It is thus possible for example to download the computer program from a network, in particular the Internet, from a data source, for example a server, and to load it in an internal memory of the computer unit such that the computer unit is able to execute the computer program. The computer program product comprises a computer-readable medium on which the program code sections are stored. Such a computer-readable medium may be for example a storage module, for example a PROM, a compact disk, a USB stick or the like.

The cyberphysical system is designed, using the coupling module, to be able to provide at least one service in communication between at least two application modules. For this purpose, the coupling module makes provision for at least the application interface of at least one of the at least two application modules to be implemented in the coupling module. The coupling module furthermore has an activatable service, which—as already explained above—is able to intervene in the communication between the control module and the application module, specifically at a predefined or predefinable mount point, and which is able to be controlled accordingly. The mount point may be ascertained automatically, for example on the basis of the communication between the at least two application modules.

The service may furthermore of course also be decoupled, in particular when it is no longer required. The coupling module is thus interposed between the at least two application modules and establishes the communication connection between these two application modules. This gives the option, without interfering with the previous intended function in relation to the communication between the at least two application modules, of providing additional services when required and activating or deactivating them. The cyberphysical system is thereby able to be improved as a whole, in particular with regard to its flexibility and use.

It is furthermore proposed for the at least one service to be loaded via a service interface of the coupling module. For this purpose, the coupling module may be connected in terms of communication to a corresponding database or data source or service source via the service interface. By way of example, provision may be made for a predefined service to be loaded into the coupling module via the service interface in a manner controlled by a control center. The coupling module may for this purpose for example be connected in terms of communication to the control center in order to be controlled.

It is furthermore proposed for the at least one service to be run in the coupling module after being loaded. Running the service in the coupling module thus makes it possible to use the corresponding service and to make it available. There is of course also the option of using the running of the service to provide a control option for the coupling module, in particular for the service being run, in order for example to be able to control further functionalities with regard to the use of the service. Data acquired and/or ascertained by using the service may furthermore of course also be provided.

The at least one service is provided in an activatable manner after being run. This makes it possible to control the use of the service in a demand-oriented manner, in particular with regard to the communication connection. The service thus does not need to be activated permanently. Provision may however be made for the running of the service at the same time also to comprise activation thereof. However, the activation of the service is separate from the running of the service, which makes it possible to be able to keep influences caused by the use of the service as low as possible.

According to one development, it is proposed for a mount point to be ascertained for the at least one service. The mount point makes it possible to couple the function of the service to the communication in the communication connection in an appropriate manner, such that the desired use of the service is able to be achieved. The mount point may be for example a specific point in a signal sequence or data sequence of the communication. For this purpose, provision may be made for the communication in the communication connection to be acquired and evaluated by way of the service or else by the coupling module itself in order to be able to ascertain the most expedient mount point. When the service is activated, it is then coupled in at the correspondingly ascertained mount point.

The service is activated on the basis of a control signal. This control signal may be a control signal that the coupling module receives from a separate unit, for example the control center or the like. There is in principle of course also the option of the control signal being provided by at least one of the at least two application modules. The coupling module may provide the control signal directly for the at least one service. Provision may of course also be made for the coupling module to initially evaluate the control signal and then activate the service on the basis of the evaluation.

It is furthermore proposed for a function call of one of the application modules to be ascertained and for data of the function call to be acquired by way of the activated service. This provides the option of acquiring the function of the application module, in particular monitoring it and also providing corresponding data about the activated service. These data may be transmitted for example to the control center, a user of the cyberphysical system or the like. Of course, the data may possibly also be stored using the coupling module. The data may be operating data with regard to the at least one application module.

It is furthermore proposed for a function response of one of the application modules to be ascertained and for data of the function response to be acquired by way of the activated service. This makes it possible for example to ascertain the functional preparedness of the application module. In this case too, the data may for example be stored either by way of the coupling module, in particular stored so as to be able to be retrieved, or else transmitted to the control center. The function of the cyberphysical system may thereby be further improved.

It is furthermore proposed for the acquired data to be evaluated and for at least the function call or the function response to be adapted on the basis of the evaluation of the data before the function call or the function response is transmitted from the respective coupling module to the respective other application module. In this refinement, the service of the coupling module may thus be interconnected into the communication between the at least two application modules and influence the communication. This makes it possible to further improve the flexibility with regard to the control of the cyberphysical system. By way of example, additional operating specifications or security specifications may additionally be made available by the cyberphysical system by way of the coupling module, in particular the at least one service.

According to one development, it is proposed for the service to acquire the communication between the at least two application modules, to analyze it with regard to predefined data and to output a warning signal on the basis of the analysis. This makes it possible to monitor the function of the cyberphysical system better, for example with regard to operating parameters, functions, problem states and/or the like. The operational reliability of the cyberphysical system is thereby able to be further improved.

It is ascertained, in the course of the analysis, whether one of the application modules is functioning as intended. This concerns the use of the cyberphysical system as a whole and may for example be safety-relevant. Furthermore, this may also be relevant from the usage standpoint of any cyberphysical module, for example in the manufacture of products or the like. By way of example, it may be ascertained whether one of the at least two application modules has a problem operating state, is transmitting defective data to the respective other application module and/or the like. The reliability and the usability of the cyberphysical system may thereby be improved.

Provision may in particular be made to establish the communication between at least one of the at least two application modules and a third application module on the basis of the intended function of the at least one application module. This makes it possible to provide redundancy, meaning that the cyberphysical system node is still able to be operated as intended. This case may be relevant for example when the application module has a problem and the application module is no longer able to be operated accordingly. This may be ascertained by way of the service of the coupling module. Furthermore, the service may also ascertain that another third application module is available and is able to take over control of the application module, and reroute the communication to this third application module. For this purpose, there may then for example be an intervention in the communication connection and the communication connection may be established from the first problematic application module to a third operationally ready application module. This makes it possible to further improve the reliability of the cyberphysical system.

It is furthermore proposed for the service of at least one of the at least two application modules to be identified and activated on the basis of the identification. The service therefore needs to be activated not only for example by the control center, but rather its activation may also be dependent on which application modules are currently in a communication connection. This makes it possible to adapt the use of a specific service to specific application modules in an automated manner. This does not require any separate control functions to be provided.

The advantages and effects cited for the method according to embodiments of the invention of course also apply analogously to the computer program product according to the invention, the electronically readable data carrier according to embodiments of the invention, the cyberphysical system according to embodiments of the invention and the coupling module according to embodiments of the invention, and vice versa. As a result, method features may also be worded as relating to a device or vice versa.

The exemplary embodiments explained below are preferred embodiments of the invention. The features and combinations of features cited above in the description and also the features and combinations of features cited in the following description of exemplary embodiments and/or shown only in the figures may be used not only in the respectively specified combination, but also in other combinations. Embodiments that are not shown explicitly and explained in the figures, but are apparent and able to be produced through separate combinations of features from the explained embodiments, should thus also be considered to be encompassed and disclosed by embodiments of the invention. The features, functions and/or effects illustrated based on the exemplary embodiments may each constitute individual features, functions and/or effects of embodiments of the invention to be considered independently of one another on their own and which also each develop embodiments of the invention independently of one another. The exemplary embodiments are therefore also intended to comprise combinations other than those in the explained embodiments. The described embodiments may furthermore also be supplemented by other ones of the features, functions and/or effects of embodiments of the invention that have already been described.

BRIEF DESCRIPTION

Some of the embodiments will be described in detail, with reference to the following figures, wherein like designations denote like members, wherein:

FIG. 1 shows a schematic block diagram of a cyberphysical system node or process, in which three function modules of a cyberphysical system communicate with one another;

FIG. 2 shows a schematic block diagram as in FIG. 1, in which function modules are coupled to one another in terms of communication via coupling modules of the cyberphysical system;

FIG. 3 shows a schematic block diagram as in FIG. 2 of a detailed illustration of the communication coupling by way of the coupling module between two function modules;

Figure 18:
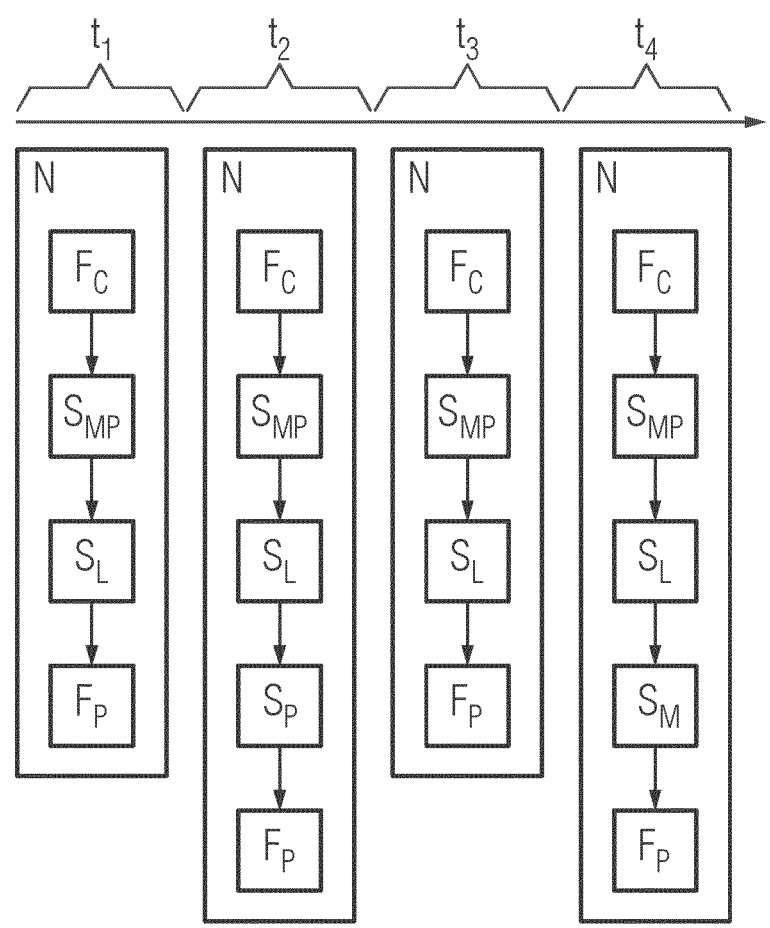
Figure 19:
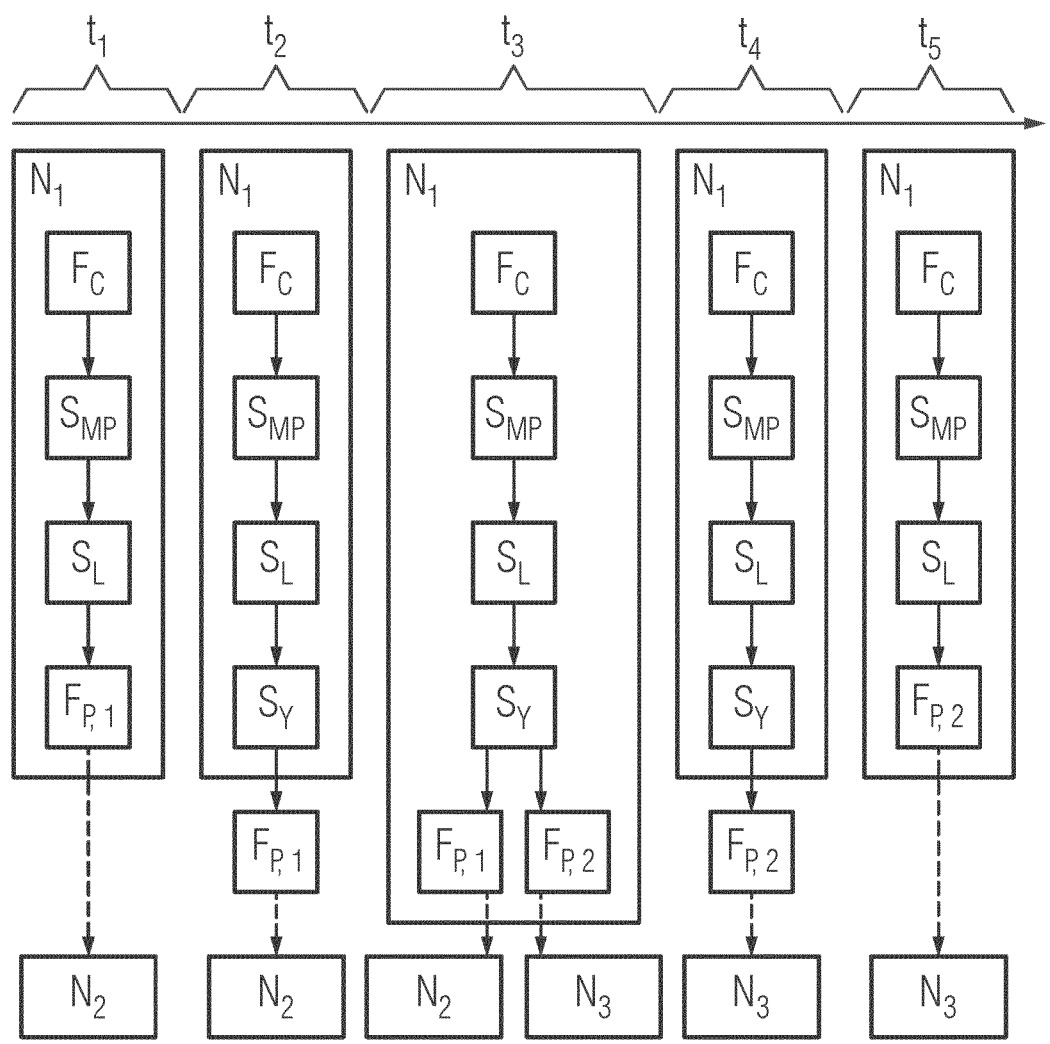

FIG. 18 shows a schematic block diagram of a first application with a sequence that uses a coupling module to monitor the operation of one or more function modules of a cyberphysical system during intended operation; and FIG. 19 shows a schematic block diagram as in FIG. 18 of a second application for intervening in a function module of a cyberphysical system in order to establish an alternative or improved functionality or a communication connection to another cyberphysical system node or process.

DETAILED DESCRIPTION

FIG. 1 shows a schematic block diagram of a cyberphysical process or node 32 that comprises three function modules 12, 14, 16 of the cyberphysical node 32. In the present refinement, provision is made for the function module 12 to be a control module that serves to carry out a task in a function domain of the cyberphysical system 32. The control module is in the present case an application module. The control module 12 serves to provide the intended operation of the further function modules 14, 16, which constitute application modules in the present case. The application modules 14, 16 may for example be a robot arm, like the application module 14, or else a sensor, like the application module 16. The principle of embodiments of the invention is however not restricted thereto. The number of function modules may of course also be varied as needed without departing from the concept of embodiments of the invention.

FIG. 1 shows the cyberphysical system node 32, in which the application module 16 provides an application interface 26 via which communication is possible with the application module 16 from outside the cyberphysical system node 32. The application module 16 communicates with the control module 12 via a control interface 22. The control module 12 furthermore communicates with the application module 14 via an application interface 20 of the application module 14. The application module 14 for its part communicates with the control module 12 via a control interface 18.

The function modules 12, 14, 16 are function modules of the cyberphysical system node 32 with functions $F_I$. In one refinement, it is thus possible for the application module 16, which represents a sensor, to transmit sensor data to the control module 12 via the control interface 22. The application module 14, which may represent a robot arm, may receive control data or control commands from the control module 12 and transmit position data and operating data to the control module 12 via the control interface 18. This makes it possible to achieve an intended operation.

The refinement according to FIG. 1 proves to be disadvantageous in that additional services are able to be implemented retrospectively only with a great deal of effort.

FIG. 2 shows a schematic block diagram, like FIG. 1, of how respective coupling modules 28, 30 are interposed between the function modules 12, 14, 16. The application and control interfaces 18, 20, 22, 26 are in the present case extracted from the respective function modules 12, 14, 16 and implemented in the respective coupling modules 28, 30. The coupling modules 28, 30 in this case thus provide the communication connection between the function modules 12, 14, 16. The coupling modules 28, 30 may be used to completely decouple the function modules 12, 14, 16.

In each case two of the function modules 12, 14, 16 communicate in the present case via a respective one of the coupling modules 28, 30. The communication between the function modules 12, 14, 16 is dependent on or is provided by the interposed coupling modules 28, 30. The function modules 12, 14, 16 are no longer coupled directly to one another in terms of communication.

The coupling modules 28, 30 are also not dependent on the function modules 12, 14, 16. The coupling modules 28, 30 however provide the respective interfaces 18, 20, 22, 26, via which the respective communication is then able to be routed between the function modules 12, 14, 16.

If the coupling modules 28, 30 are interposed between the function modules 12, 14, 16, the coupling modules 28, 30 do not bring about any overhang next to activated functions of the cyberphysical system indirectly via function pointers.

The application interfaces 18, 20, 22, 26 of the functions of the cyberphysical system node 32 and the implementations of the functions remain unchanged. The application interfaces 18, 20, 22, 26 of the function modules 12, 14, 16 are separated from the respective function modules 12, 14, 16 and are acquired by the coupling modules 28, 30. These are thus inserted or interposed between the function modules 12, 14, 16 in order to maintain the communication in the function modules 12, 14, 16 while maintaining semantics defined for the application interfaces 18, 20, 22, 26.

FIG. 3 shows, based on an example using the function modules 12, 16 and the coupling module 28, how a mount point 36 is able to be implemented taking into consideration the function interfaces 22 and a function interface 34, wherein the semantics defined for the function interface 22 may be retained. FIG. 3 shows the mount point 36 (service hook) in the form of an example.

A mount point generally implements a separated interface from a function of a cyberphysical system node. The implementation of the mount point 36 serves inter alia to couple or to decouple specific functions of the cyberphysical system node 32, to dynamically couple and decouple specific services 10, 24 of the cyberphysical system node 32, and to forward function calls to coupled services 10, 24 and/or functions of the cyberphysical system node 32.

A mount point such as the mount point 36 is a specific service regarding a function of the cyberphysical system. A mount point such as the mount point 36 is contained in the coupling module 28 and runs in the coupling module 28. The mount point 36 may couple no or multiple dynamically loadable specific services of the cyberphysical system for the same cyberphysical function. The service 10, 24 may for example comprise monitoring, testing, activating or deactivating, safeguarding and/or the like. Specific services of the cyberphysical system run in the function module 42 of the cyberphysical system.

In FIG. 3, a service module 38 loads one or more services or service instances by way of a service unit 40 $D_S$ into a system runtime of the coupling module 28. These services are instantiated in order to surround CPU function instances that have been loaded and instantiated by a function unit 44 $D_F$.

Mount points such as the mount point 36 in the coupling module 28 and all services that are coupled to the mount points may contain the semantics of the application interfaces 20, 34 that are implemented in the coupling module 28. The mount points are thus implemented around functions in the function modules. A mount point such as the mount point 36 shows a corresponding assigned function in a function module 42 with the option of coupling in the extra-functional service during runtime of the cyberphysical system node 32, specifically by implementing the same application interface as that of the assigned function, as illustrated further with reference to FIG. 4.

Figure 4:
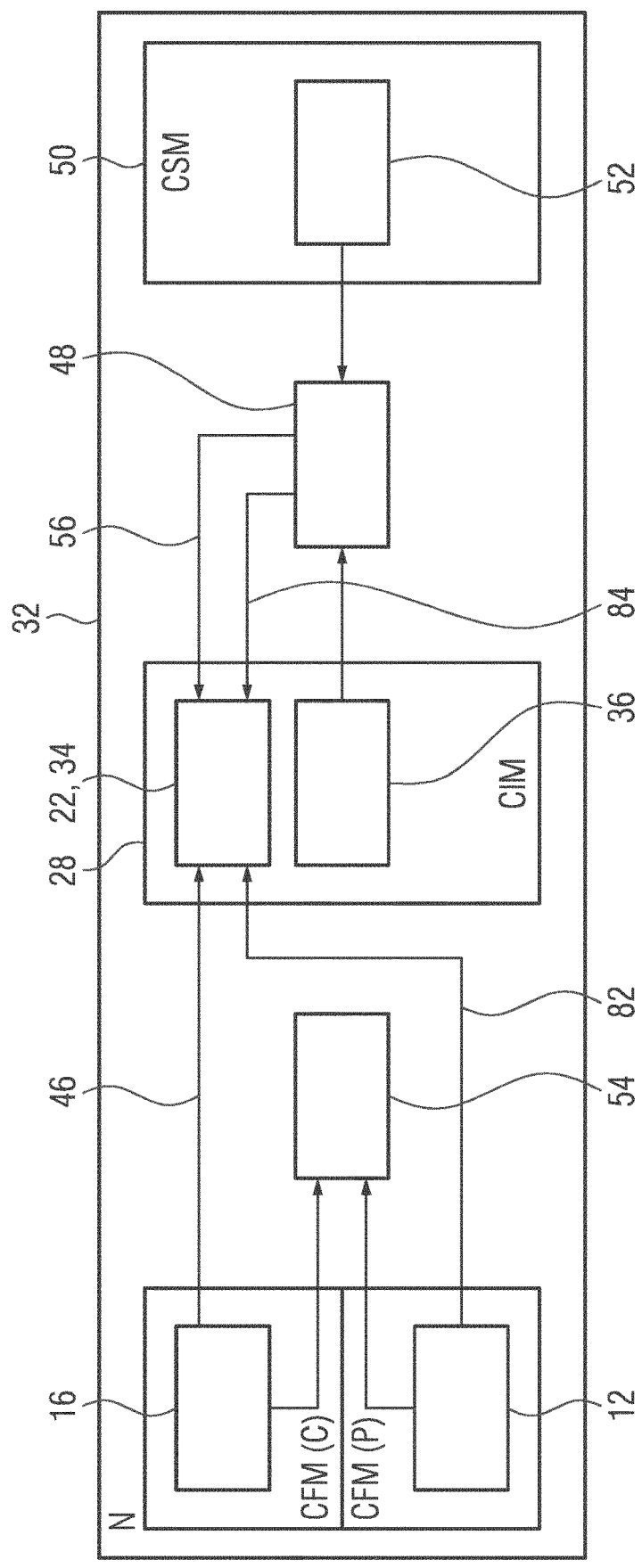
FIG. 4 shows a schematic block diagram of a node configuration according to FIG. 3.

In FIG. 4, 46 denotes a function call of the application module 16 that is transmitted to the coupling module 28. Likewise, 82 denotes a function call of the control module 12 that is transmitted to the coupling module 28. 54 denotes a function. In the coupling module 28, the function calls 46, 82 are transmitted to a respective interface 22, 34. Furthermore, a mount point 36 is ascertained and is transmitted to a service unit 48. The service unit 48 receives, from a service module 50, a specific service 52 that is transmitted to the service unit 48. At 56 and 84, a call of a next service or a next function is transmitted to the interface 22, 34.

The application module 16 is a function module of the cyberphysical system 32 with functions in a client role. The function module 12 is a function module with functions in a server role or provider role. The arrows in FIG. 4 illustrate an implementation, for example whereby the function 54 is implemented by the function modules 12, 16. Likewise, the service unit 48 implements the mount point 36 and the specific service 52.

The following first program listing shows a node configuration mode:

01: LOAD <CSM:Service> INTO <CIM> // State s0 → s1 in Figure 5
02: UNLOAD <CSM:Service> FROM <CIM> // State s1 → s0 in Figure 5
03: CREATE <CSM:Service:Instance> FROM <CSM:Service> // State s1 → s2 in Figure 5
04: DELETE <CSM:Service:Instance> FROM <CSM:Service> // State s2 → s1 in Figure 5
05: MOUNT <CSM:Service> (BELOW|ABOVE) <CSM:Service:Instance>
// State s2 → s3.1 in Figure 5
06: UNMOUNT <CSM:Service:Instance> // State s3.1 → s2 in Figure 5
07: ENABLE (CALL|RETURN) <CSM:Service:Instance> // State s3.1 → s3.2 in Figure 5
08: DISABLE (CALL|RETURN) <CSM:Service:Instance> // State s3.2 → s3.1 in Figure 5
09: PARAMETER <CSM:Service:Instance> WITH <ParameterName> = <ParameterValue> // States3 → s3 in Figure 5

These configuration sequences control the services of the cyberphysical system of a cyberphysical system node 32 by way of a status machine, as illustrated with reference to FIG. 5.

Figure 5:
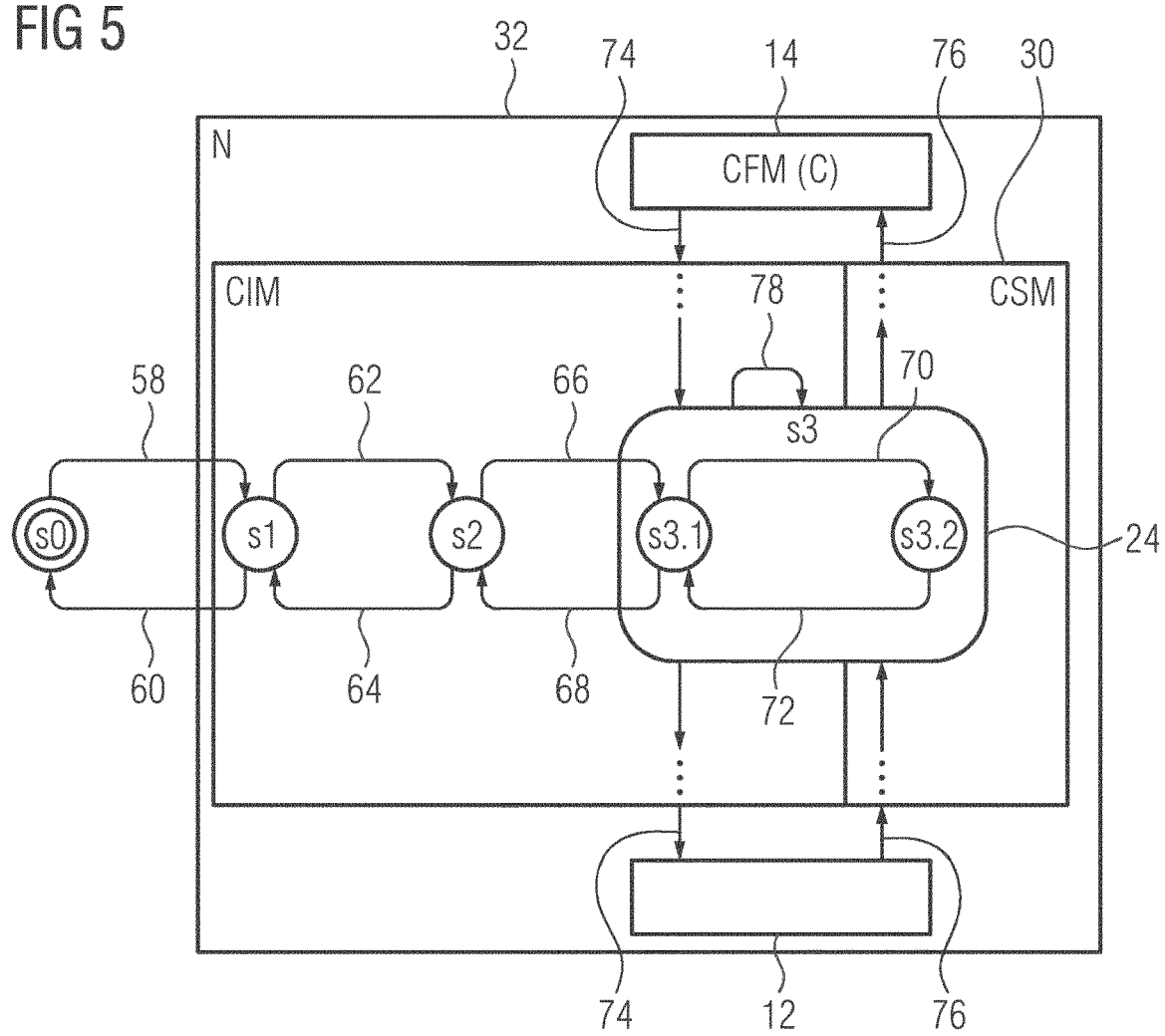
FIG. 5 shows a schematic illustration of a state diagram with regard to the active provision of a service by the coupling module according to FIG. 3.
Figure 6:
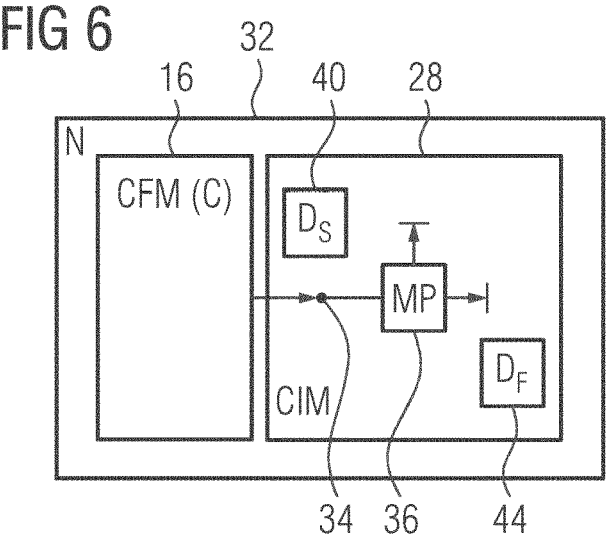
FIG. 6 shows a schematic block diagram with regard to a changing of a structure or configuration of the cyberphysical system node or processes in a starting state.

In FIG. 5, S0 denotes a start state and an end state in which a service of the cyberphysical system and a service hosting is not present in the cyberphysical system node 32. The state S1 denotes a service module that is loaded. However, the service is not yet provided. The state S2 denotes the provided service. The state S3 denotes the service that intervenes at a specific point of a service stack. The state S3.1 denotes the service in the deactivated state. The state S3.2 denotes the service in the activated state.

58 illustrates the loading of the service into the coupling module 30. There is thus a transition from the state S0 to the state S1. At 62, the service is provided, whereupon a transition to the state S2 takes place. Finally, a mount point is ascertained at the transition according to reference sign 66, whereupon the state S3.1 is adopted. 70 illustrates a transition from the deactivated state S3.1 to the activated state S3.2. The service is then active. 78 illustrates that the service is able to be parameterized.

72 denotes the transition from the activated state S3.2 to the deactivated state S3.1. At 68, the service is decoupled, and so the state S2 is adopted. 64 illustrates a transition to the state S1, in which the provision of the service is cancelled. At 60, the service may be deleted.

74 denotes a function call from the application module 14 to the control module 12, whereas 76 shows a function response from the control module 12 to the application module 14. FIG. 5 thus shows a life cycle of an extra-functional service in the cyberphysical system node 32.

The second program listing illustrated below shows an implementation of the status machine according to FIG. 5. This implementation performs on-demand loading, instantiation and activation of the service around a corresponding function. Other implementations are of course also possible, for example implementations that comprise separate loading, instantiation or activation of the service during a service phase of a cyberphysical system node, during an operating phase of the cyberphysical system 32, or the like.

Figure 10:
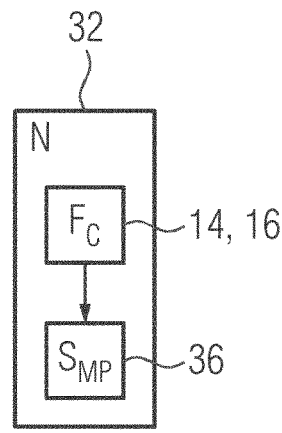
FIG. 10 shows a schematic diagram of a state illustrations for activation of various services.
Figure 13:
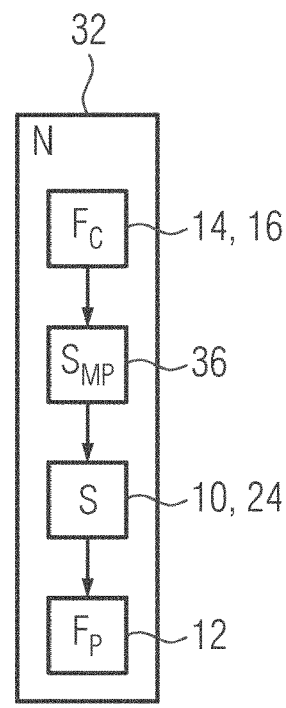
FIG. 13 shows a schematic diagram of a state illustrations for activation of various services change.
Figure 14:
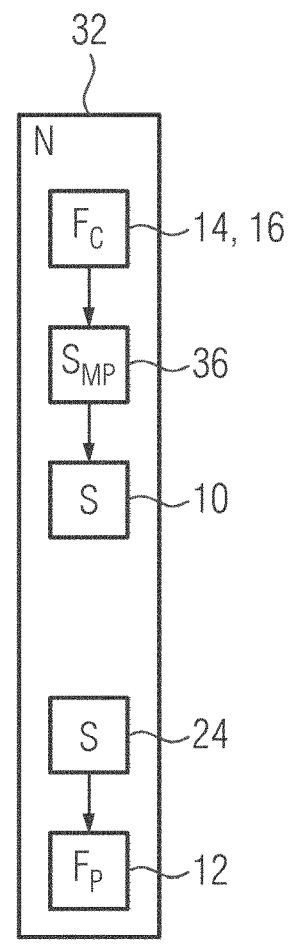
FIG. 14 shows a schematic diagram of a state illustrations for activation of various services.

```
01: MountPoint.F(p1, ...) do // Mount point for services around
    CPS function F with parameters p1,..., if any.
02: // State s0 in Figure 5
03: if new CPS service(s) specified in the node configuration
    then
04:   load the CSM(s) that contains the new service(s)
05: // State s1 in Figure 5
06: instantiate specified CPS service(s)
07: // State s2 in Figure 5
08: hook CPS service instance(s)
09: // State s3.1 in Figure 5
10: if service(s) enabled in the CPS node / process configu-
    ration then
11:   enable CPS service instance(s)
12: // State s3.2 in Figure 5
13: for all hooked and enabled CPS services before CPS func-
    tion do
14:   call CPS service S_before(p1, ...)
15: call CPS function F(p1, ...)
16: for all hooked and enabled CPS services after CPS func-
    tion do
17:   call CPS service S_after(p1, ...)
18: return value from CPS function F or from Last CPS service
    S or default values
```

FIGS. 6 to 9 once again show how the structure or configuration of the cyberphysical system node 32 changes, starting from a state according to FIG. 6, in which a function module 16 is communicating with at least one control module 12 and a coupling module 28 having a mount point 36 is present, to a state according to FIG. 9, in which the following module is additionally loaded, specifically a service module with one or more specific services around the control module 12. The corresponding service may be loaded from the service module 50 via a service interface 86 implemented in the coupling module 28, 30.

Figure 7:
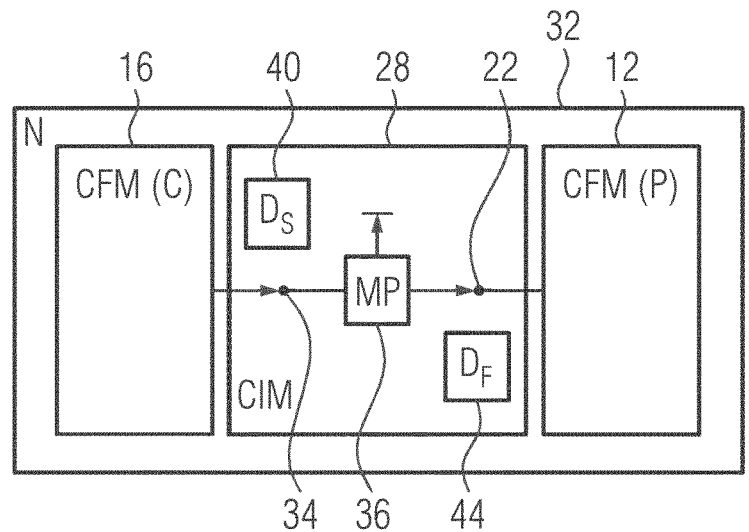
FIG. 7 shows a schematic block diagram with regard to a changing of a structure or configuration of the cyberphysical system node or processes in an intermediate state.
Figure 8:
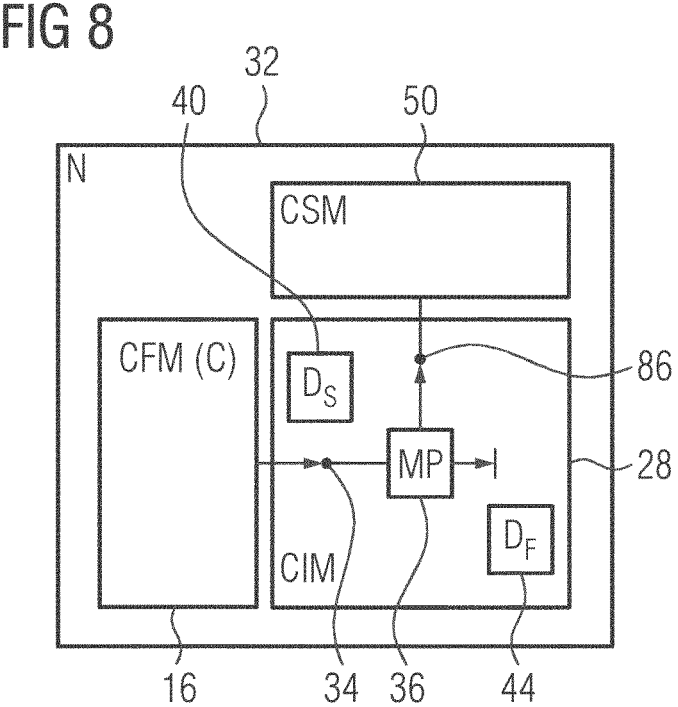
FIG. 8 shows a schematic block diagram with regard to a changing of a structure or configuration of the cyberphysical system node or processes in an intermediate state.
Figure 9:
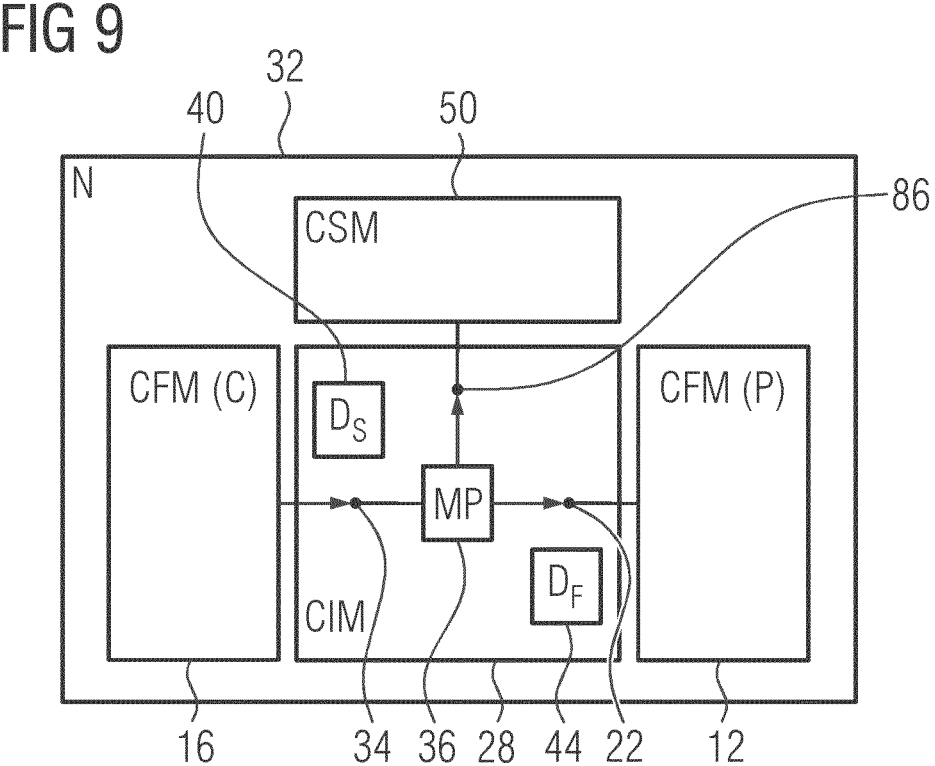
FIG. 9 shows a schematic block diagram with regard to the changing of the structure or configuration of the cyberphysical system node or in a final state.

FIGS. 7 and 8 show intermediate states and two alternative transfer paths. For instance, one transfer path may be starting from FIG. 6 via FIG. 7 to FIG. 9, whereas another transfer path may be starting from FIG. 6 via FIG. 8 to FIG. 9. In all configurations from FIG. 6 to FIG. 9, the cyberphysical system node or process 32 is executed. The prescribed mechanism makes it possible to use a wide variety of configurations of services for the cyberphysical system between functions of the cyberphysical system node or process 32, as illustrated with reference to further FIGS. 10 to 16.

Figure 15:
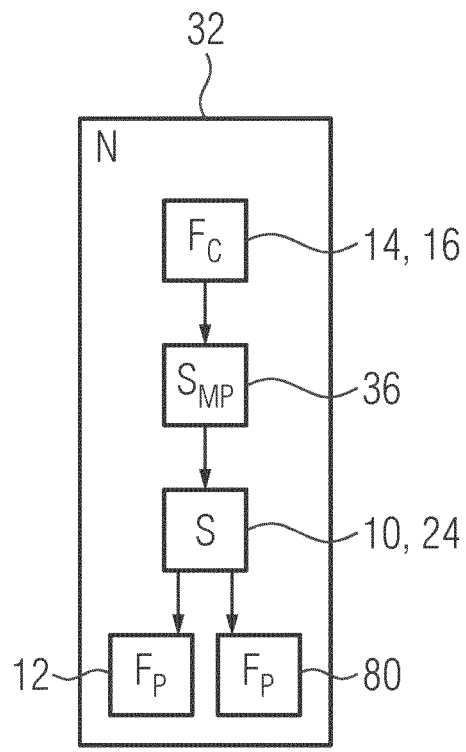
FIG. 15 shows a schematic diagram of a state illustrations for activation of various services.
Figure 16:
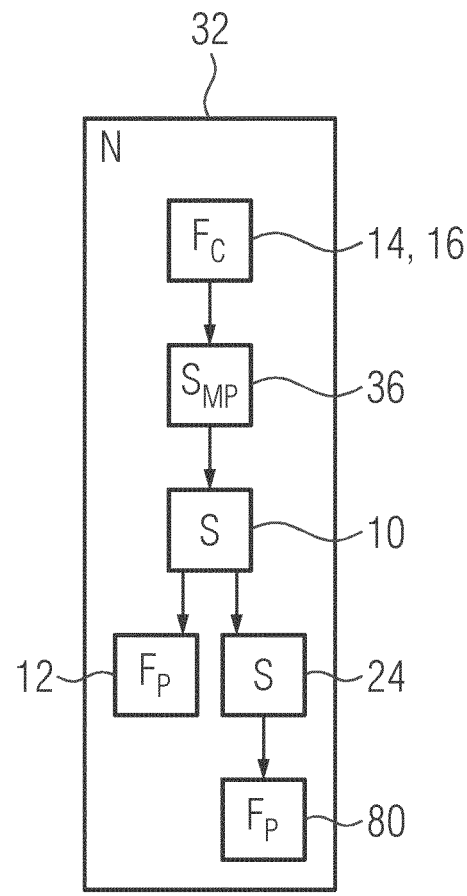
FIG. 16 shows a schematic diagram of a state illustrations for activation of various services.

FIGS. 15 and 16 show in particular a failover, in which the application module 14, 16 is coupled over from a first control module 12 to a second control module 80, for example when the first control module 12 has a problem. Various other uses are also apparent, with reference being made in particular to the above explanations.

Figure 11:
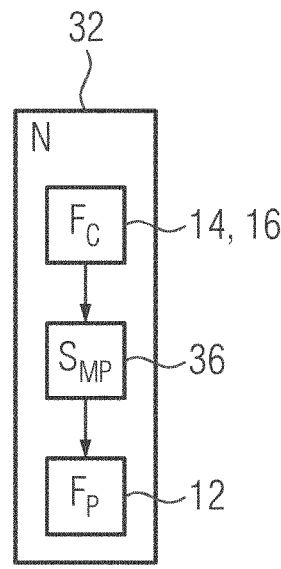
FIG. 11 shows a schematic diagram of a state illustrations for activation of various services.
Figure 12:
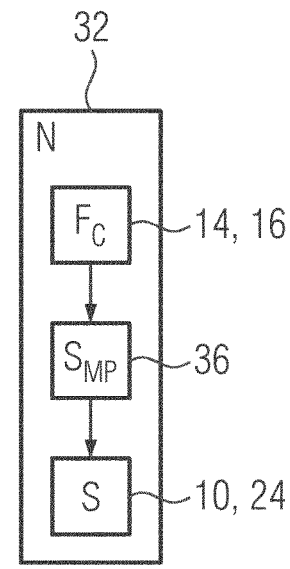
FIG. 12 shows a schematic diagram of a state illustrations for activation of various services.
Figure 17:
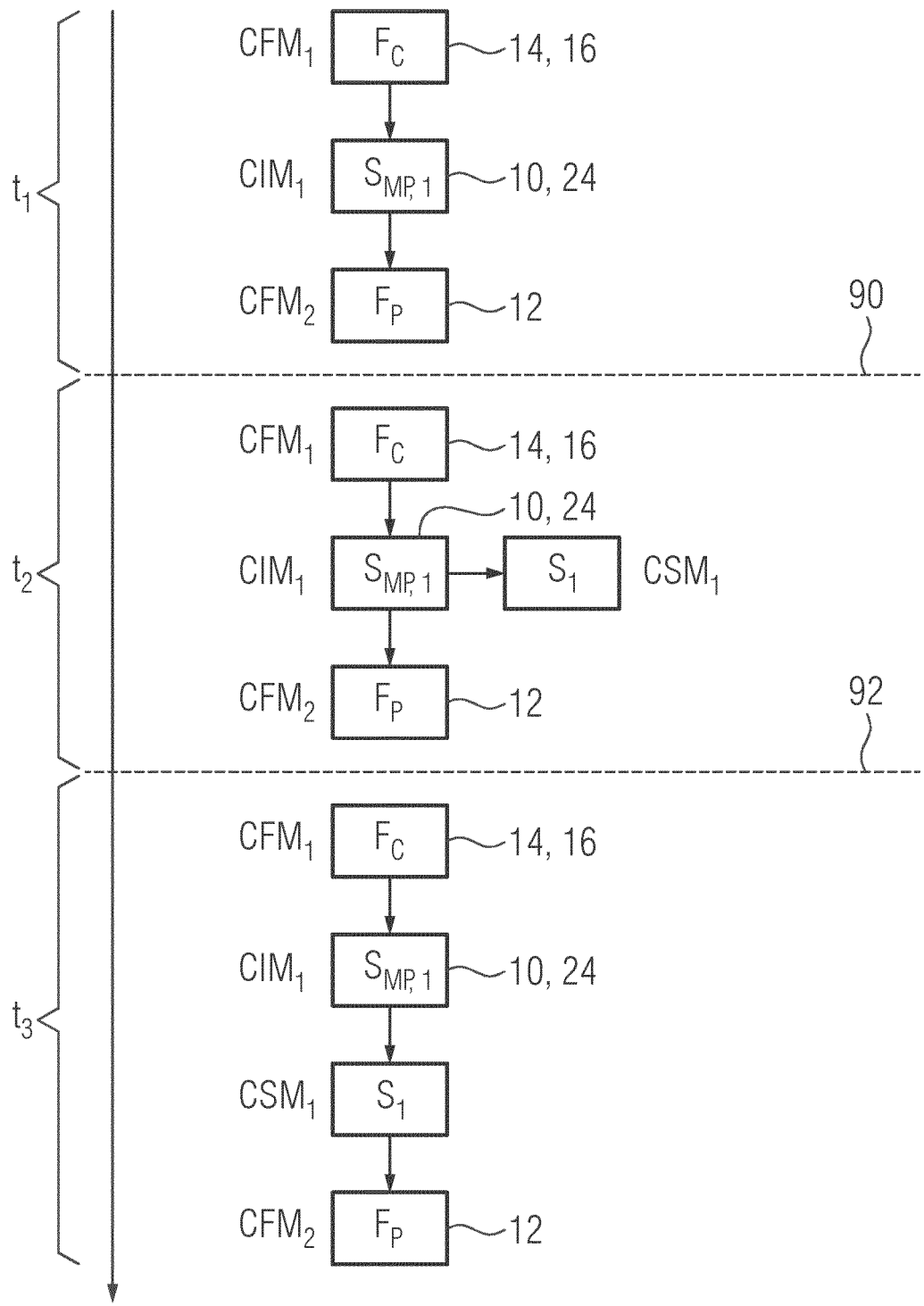
FIG. 17 shows a schematic block diagram of an operating configuration of a coupling module according to FIG. 5, with parameter changes of a service.

FIGS. 10 to 16 illustrate different states between which it is possible to change. A change from the state according to FIG. 11 to the state according to FIG. 12 is illustrated for example in FIG. 17, wherein a parameter of a service of the cyberphysical system is changed. At the time $t_1$, the service is not yet coupled. The coupling is however present at the time $t_2$, wherein the service is however still deactivated. At the time $t_3$, the service is then activated.

At the time $t_1$, the state according to FIG. 11 is present, wherein, at the time $t_3$, the state according to FIG. 12 is present. At the time $t_2$, the service is still deactivated.

The reference sign 90 illustrates a first transition in which a configuration mode may be performed, according to the following third listing:

```
//State S0 in Figure 5
01: Load CSM_1 INTO CIM_1
02: CREATE S_1 FROM CSM_1
03: MOUNT S_1 AFTER S_{MP,1}
// State S3.1 in Figure 5
```

The reference sign 92 provides a following transition from the time $t_2$ to the time $t_3$ with a configuration mode according to the following fourth listing:

```
// State S3.1 in Figure 5
04: PARAMETER S_1 WITH Rate=5
// State S3.1 in Figure 5
05: ENABLE S_1
// State S3.2 in Figure 5
```

The following application cases of embodiments of the invention show how analysis is able to be performed through dynamic analysis of state parameters of an incorrectly functioning cyberphysical system node 32.

The aim here is to obtain a deeper look into the cyberphysical system with regard to the operation in the case of a problem, unusual behavior and/or the like, for example with regard to one or more functions, in particular function modules.

The cyberphysical system runs for a relatively long time. A login service of a cyberphysical node suddenly reports an increase in incorrect server requests. The performance of the cyberphysical system node 32 drops. The log records of the affected cyberphysical system node 32 do not give any indication of the reason for the performance drop. In order to allow a better look into the operation of the affected cyberphysical system node 32 for an operator, the operator will perform an extended health check, for example using extra-functional services. The affected cyberphysical system node 32 is designed and implemented to be operated in the degraded mode. However, this makes it possible to achieve only a reduced, suboptimum system performance, which is undesirable.

The effect also occurs for the first time. In order to carry out an analysis under realistic current conditions, the operator installs and experiments with multiple extended health checks during runtime without redeploying and restarting the affected cyberphysical system node 32, as illustrated with reference to FIG. 18. $F_C$ denotes a function in a function module of the cyberphysical system in the role of an application client. $F_P$ denotes a function in a function module of the cyberphysical system in the role of a function provider or control module. $S_{MP}$ denotes a mount point for a special service in a coupling module. $S_L$ denotes a log function call. $S_P$ denotes a service for measuring an execution time and $S_M$ denotes a service dump memory.

The scenario in FIG. 18 takes place using a coupling module as follows:

Time $t_1$: The cyberphysical node is running, but the intermediate service $S_L$ exhibits an unusual amount of incorrect function calls of the function $F_P$. For performance reasons, the service $S_L$ is concise with regard to documentation and stores only few data, for example a signature of the function $F_P$, key function parameters and function response codes.

Time $t_2$: The function response codes exhibit an increasing complaint rate for a relatively long period of time. The initial assumption is that excessive response times and exceeded limits cause these complaints. An operator of the cyberphysical system accordingly installs a performance measurement service $S_P$ with regard to the execution of the function $F_P$. The service $S_P$ is loaded and a mount point is ascertained with regard to the service $S_L$ and the function call of the function $F_P$.

Time $t_3$: The performance data that are delivered by the performance measurement service $S_P$ exhibit normal behavior. The incorrect server requests therefore appear to have a different cause. The operator of the cyberphysical system decouples the service $S_P$. The cyberphysical system node 32 is then back in the same state as at the time $t_1$.

Time $t_4$: The intention is now to analyze the internal state of the cyberphysical system node, in particular the status of the function $F_P$, with regard to unusual data. The operator therefore installs a memory scanner SN with regard to the executed function $F_P$. The service $S_M$ erases the memory using which the function $F_P$ was run before and after the calling of the function $F_P$. It should be noted here that the memory of a function of the cyberphysical system may be contained in a separate reserved memory module or data module. A data module is assigned to a specific function of the cyberphysical system and corresponds to a data area in a skill-executed context (SEC), which is used by a task to store task-internal data.

The cyberphysical system node 32 is designed to be tested during runtime without influencing the temporal behavior of the cyberphysical system node 32. The extra-functional services $S_P$ and $S_M$ implement the same function interface as $F_P$ and $S_{MP}$, without changing their functional meaning. Both also remain within the specified or permitted time limits for the function $F_P$. The services $S_P$ and $S_M$, preferably both of them, may therefore be interposed between the functions $F_C$ and $F_P$.

FIG. 19 shows a schematic block diagram of a further application case for dynamically changing function implementations of an incorrectly functioning cyberphysical system node $N_1$ 32 using a coupling module. The aim here is to apply a different variant to a function that is contained in a function module of a cyberphysical system in order to enable an alternative or improved functionality or to enable a connection to another cyberphysical system node or process $N_2$, $N_3$. The intention is to apply an updated implementation of a function that uses an external database system. This new version rectifies a performance defect of a previous version and uses a different database system.

In a transition period, only developers and testers of the cyberphysical system should use the updated implementation. This is illustrated with reference to FIG. 19. In addition, $F_{P,1}$ denotes a first version of the function $F_P$ in the role of a function provider, $F_{P,2}$ denotes an updated version 2 of the function $F_P$ and $S_Y$ denotes a service that changes over between two or more function providers. The dashed arrow denotes the call of a function of another cyberphysical system node.

The sequence according to FIG. 19 is as follows:

Time $t_1$: The cyberphysical system node is operational, but the intermediate service $S_L$ exhibits an unusual level of incorrect performance calls of the function $F_{P,1}$. Entries in the log files of the cyberphysical system node 32 and analysis of the source code of the function $F_{P,1}$ shows that the reason for the poor performance is an implementation error.

Time $t_2$: An operator of the cyberphysical system applies a service module with an extra-functional service $S_Y$ that dynamically loads a second alternative function module in parallel with an already applied function module and changes over between the alternative function modules.

Time $t_3$: A developer of the cyberphysical system develops the function $F_{P,2}$, which is an improved version of the function $F_{P,1}$, and applies it using the service $S_Y$. The changeover may be set or controlled so as to route only specialized requests to the new version. This allows predefined testing, for example by routing only requests containing special tokens from the test team to the newer version. After the new version $F_{P,2}$ has been tested and has been ascertained as being reliable and better, all requests may be routed to the function $F_{P,2}$ with the service $S_Y$.

Times $t_4$ and $t_5$: Removing the functions and services that are no longer required from the coupling module.

Instead of predefined routing, the service $S_Y$ could transmit only incorrect requests to the function $F_{P,2}$ in order to check whether the updated implementation is able to process the critical requests correctly.

There is also the option for a further third application in order to perform dynamic changes of execution traces by a cyberphysical system node. The aim here is to supplement attributes regarding control tokens that are exchanged between the cyberphysical system nodes 32. These control token attributes may be analyzed during intended operation of a cyberphysical system node 32 in order to allow a further look into the performance of the system node 32 and the operation. These attributes may be used to dynamically select alternative function implementations.

A control token that is transmitted in a cyberphysical system node 32 from a function, a function module, to a function, or a function module, should transmit additional bookkeeping data, with said control token remaining completely disregarded by the function or the function module. For example, the control token may transmit a function response code between an application function $F_C$ and a control function $F_P$. The function response code is updated following each new function call. Since the control token is transmitted by the coupling module, extra-functional services may be added to the coupling module, these giving the function of the control token added attributes for each function call during a workflow by the cyberphysical system node 32 for extended performance analysis:

An identification of the affected function $F_P$ an intervention time for the function $F_P$ a response time of the function $F_P$ An identification of a workflow indicator may additionally be added to the control token of the workflow. The initiator may for example identify a developer or an operator of the cyberphysical system. This information may be used by the extra-functional service, which is able to select alternative function implementations, as described with respect to the above exemplary embodiment.

Embodiments of the invention have in particular the following advantages over AOP: AOP may be used to add services. What is known as the weaving process may be used to integrate aspects at points at which a specific condition is met. The condition is usually the arrival or the output of a function call. When the control flow reaches such a point, an advice is executed, for example before or after the function call. Any additional code may be applied within the advice. An AOP framework, such as for example AspectJ for Java systems, may therefore be used instead of Connector Pattern, which is proposed according to embodiments of the invention. However, this only comprises providing an integration point for the mechanism that has been described according to embodiments of the invention.

In contrast to AOP, embodiments of the invention may be used without requiring additional frameworks and/or compilers for weaving entry points into the system. Embodiments of the invention may furthermore be implemented using any object-oriented programming language. In contrast to embodiments of the invention, AOP changes interfaces due to names. AOP moreover requires specific compilers, and aspects are static. However, AOP may be used to achieve implementations of extra-functional services in the coupling modules. It is not COP, because the coupling modules and the extra-functional services are dynamic, are able to be adapted and controlled during runtime, and are moreover completely independent of functions of the cyberphysical system node. COP changes the system and therefore requires compiler support.

The exemplary embodiments serve only to explain embodiments of the invention and are not intended to restrict it.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for providing at least one service in a node or process of a cyberphysical system having at least two application modules, wherein communication takes place between the at least two application modules via respective application interfaces of the at least two application modules, wherein a respective one of the application interfaces constitutes communication access to the respective application module, wherein
   at least the application interfaces of the at least two application modules are implemented by a coupling module that establishes the communication between the at least two application modules and that provides the at least one service in an activatable manner, wherein the coupling module extracts the application interfaces from the at least two application modules and combines the application interfaces in the coupling module such that the communication between the at least two application modules takes place via the coupling module, and the at least one service is dynamically controlled during a runtime of the cyberphysical system.

2. The method as claimed in claim 1, wherein the at least one service is loaded via a service interface of the coupling module, wherein the at least one service is run in the coupling module after being loaded into the coupling module.

3. The method as claimed in claim 2, wherein the at least one service is provided in an activatable manner after being run.

4. The method as claimed in claim 1, wherein a mount point is ascertained for the at least one service.

5. The method as claimed in claim 1, wherein the service is activated on a basis of a control signal.

6. The method as claimed in claim 1, wherein a function call of one of the application modules is ascertained and data of the function call are acquired by way of the activated service.

7. The method as claimed in claim 1, wherein a function response of one of the application modules is ascertained and data of the function response are acquired by way of the activated service.

8. The method as claimed in claim 6, wherein the acquired data are evaluated and at least the function call or the function response are adapted on a basis of the evaluation of the data before the function call or the function response is transmitted from the respective coupling module to the respective other application module.

9. The method as claimed in claim 1, wherein the service acquires the communication between the at least two application modules, analyzes the communication with regard to predefined data and outputs a warning signal on a basis of the analysis.

10. The method as claimed in claim 9, wherein it is ascertained, in the course of the analysis, whether at least one of the application modules is functioning as intended.

11. The method as claimed in claim 10, wherein the communication is established between at least one of the at least two application modules and a third application module on the basis of the intended function of the at least one application module.

12. The method as claimed in claim 1, wherein the at least one of the at least two application modules are identified and is activated on the basis of the identification.

13. A computer program product, comprising a computer readable hardware storage device having computer readable program code stored therein, said program code executable by a processor of a computer system to implement a method as claimed in claim 1 when the computer program is executed by the computer unit, such that at least one service is provided in an activatable manner in communication between at least two application modules of the cyberphysical system.

14. An electronically readable data carrier with electronically readable control information stored thereon that comprises at least one computer program product as claimed in claim 13 and is designed such that, when a computer unit is controlled using the control information of the data carrier, the computer unit performs a method for providing at least one service in a node or process of the cyberphysical system.

15. A cyberphysical system comprising:
   a processor configured to:
      provide at least one service in a node or process that has at least two application modules, wherein a respective one of the at least two application modules has a respective application interface, via which communication takes place between the at least two application modules, wherein a respective one of the application interfaces constitutes communication access to the respective application module,
      implement at least the application interfaces of the at least two application modules in a coupling module which is designed to establish the communication between the at least two application modules and to provide at least one service in an activatable manner, wherein the coupling module extracts the application interfaces from the at least two application modules and combines the application interfaces in the coupling module such that the communication between the at least two application modules takes place via the coupling module, and the at least one service is dynamically controlled during a runtime of the cyberphysical system.

* * * * *